(12) United States Patent
Wilson et al.

(10) Patent No.: US 6,371,242 B1
(45) Date of Patent: Apr. 16, 2002

(54) NOISE ATTENUATION PANEL

(75) Inventors: Robert Samuel Wilson, Belfast; Richard Parkes, Comber; Mark Braniff, Bangor, all of (IE)

(73) Assignee: Short Brothers PLC, Belfast (IE)

( * ) Notice: Subject to any disclaimer, the term of this patent is extended or adjusted under 35 U.S.C. 154(b) by 0 days.

(21) Appl. No.: 09/550,827

(22) Filed: Apr. 18, 2000

(30) Foreign Application Priority Data

Apr. 26, 1999 (GB) .............................................. 9909581

(51) Int. Cl.⁷ ................................................ E04B 1/82
(52) U.S. Cl. ........................ 181/292; 181/290; 181/296; 181/288; 181/210; 428/116; 493/966
(58) Field of Search ................................ 181/292, 294, 181/290, 296, 284, 288, 210; 428/116, 118, 119; 493/966

(56) References Cited

U.S. PATENT DOCUMENTS

| | | | | |
|---|---|---|---|---|
| 4,421,811 A | * | 12/1983 | Rose et al. .................. | 428/116 |
| 4,433,021 A | * | 2/1984 | Riel ........................... | 428/116 |
| 4,465,725 A | * | 8/1984 | Riel ........................... | 428/116 |
| 4,671,841 A | * | 6/1987 | Stephens .................... | 156/292 |
| 4,990,391 A | * | 2/1991 | Veta et al. .................. | 428/116 |
| 5,543,198 A | * | 8/1996 | Wilson ........................ | 428/116 |
| 6,179,086 B1 | * | 1/2001 | Bansemir et al. ........... | 181/292 |
| 6,182,787 B1 | * | 2/2001 | Kraft et al. ................. | 181/292 |

FOREIGN PATENT DOCUMENTS

| | | |
|---|---|---|
| GB | 2 122 540 B | 1/1984 |
| GB | 2252076 | 7/1992 |
| JP | 02169230 | 6/1990 |

* cited by examiner

*Primary Examiner*—Robert E. Nappi
*Assistant Examiner*—Edgardo San Martin
(74) *Attorney, Agent, or Firm*—Lyon & Lyon LLP

(57) ABSTRACT

In the manufacture of a noise attenuation panel for an aeroengine nacelle an adhesive film is applied to a front face of a cellular component of the panel. The adhesive film is caused to reticulate to the ends of the walls of the cells at the front face of the cellular component. A perforate facing component of the panel is bonded to the front face of the cellular component by adhesive flow from the cell walls to the facing component. To avoid unpredictable adhesive flow giving rise to cosmetic spots on the front face of the facing component the two components are brought together with the interposition of an adhesive flow control sheet and the reticulated adhesive caused to bond the two components together by adhesive flow under the control of the adhesive flow control sheet.

13 Claims, 7 Drawing Sheets

Prior Art

*Fig.3A*

Prior Art

*Fig.3B*

Prior Art

*Fig.3C*

Prior Art

*Fig.3D*

Prior Art

*Fig.3E*

Prior Art

*Fig.3F*

Prior Art

NOISE ATTENUATION PANEL

BACKGROUND OF THE INVENTION

The present invention relates to noise attenuation panels and is particularly, although not exclusively, concerned with noise attenuation panels for use in the attenuation of noise in aero engines.

Figure 1:
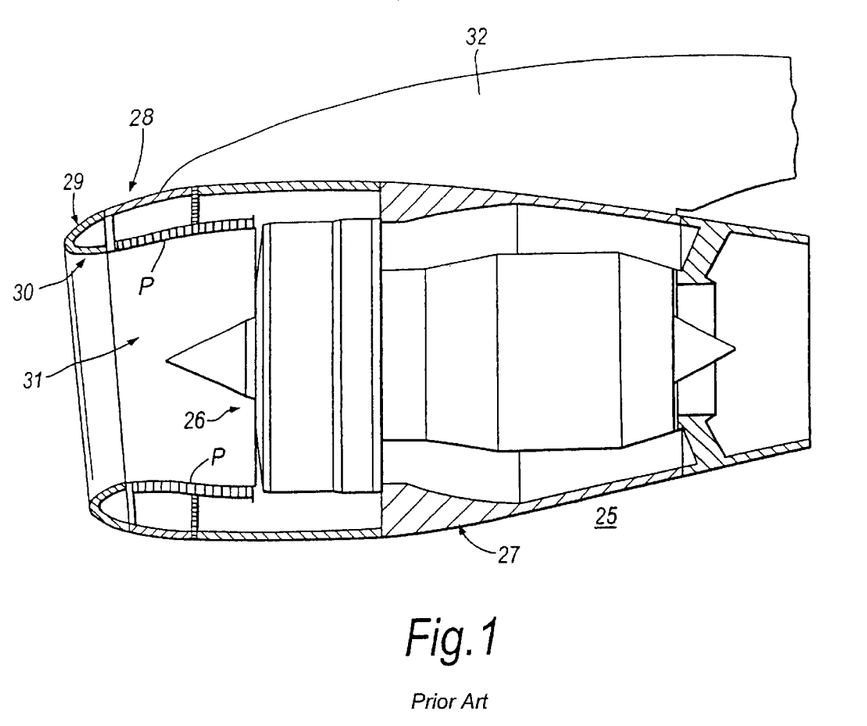
FIG. 1 (hereinbefore referred to) is a schematic cross-section of an aeroengine having a nacelle embodying noise attenuation panels.

As is schematically illustrated in FIG. 1 a typical aero engine 25 includes a turbofan power unit 26 mounted within a nacelle 27 suspended from a pylon 32. The nacelle 27 includes a nose cowl 28 having an outer wall 29 and an inner wall 30. The inner wall 30 is in part formed by noise attenuation panels P. The panels P are arranged to form part of the inner wall of the nose cowl 28 in such disposition that the outer facing sheet of the panel forms the wall surface defining the air intake duct 31 for the power unit 26, The panels P in this disposition serve to reduce noise created by the high speed flow of air passing though the duct 31 and into the power unit 26, as well as to reduce noise generated by the fan blades of the unit 26.

Figure 2:
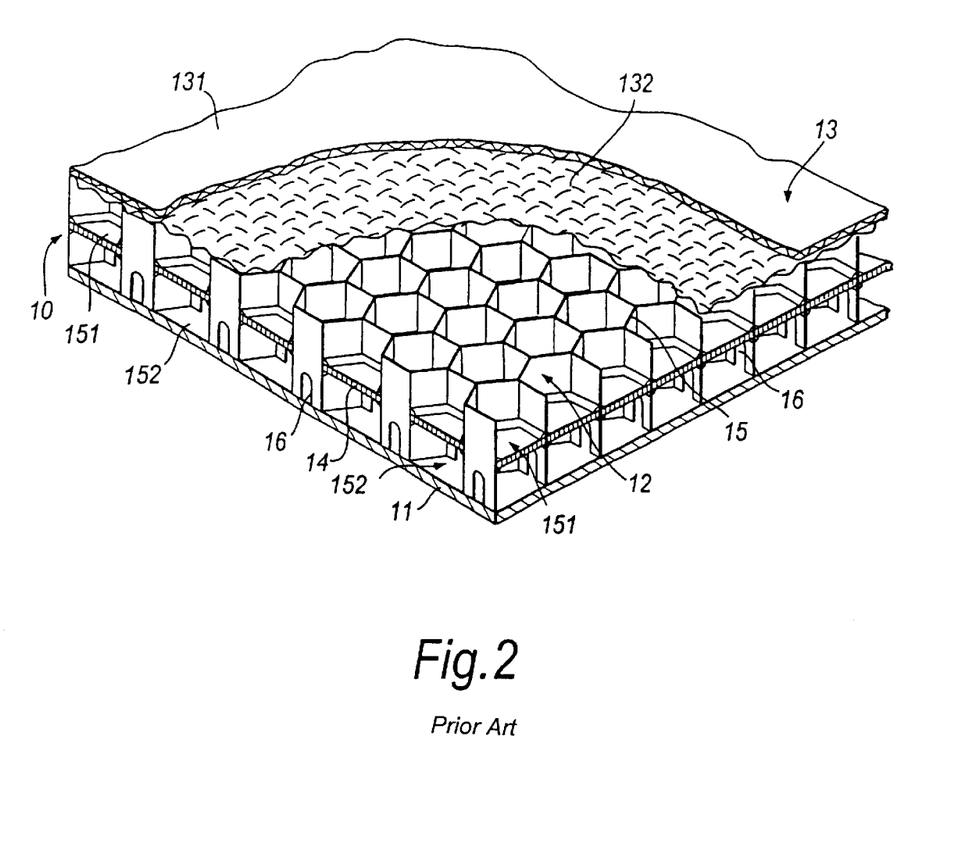
FIG. 2 (hereinbefore referred to) is a schematic isometric view from above of a noise attenuation panel for use as a panel in the aeroengine illustrated in FIG. 1.

As shown in FIG. 2, a typical noise attenuation panel 10 comprises a backing sheet 11, a honeycomb core 12 and a facing component part 13 comprising outer and inner facing sheets 131 and 132.

The core 12 comprises a multiplicity of open ended juxtaposed cells 15 of hexagonal cross section. The walls of the cells 15 extend from the front face of the core 12 to the rear face. Each cell 15 is, however, divided into an upper subcell 151 and lower subcell 152 by a septum element 14.

The outer facing sheet 131 of the facing component part 13 takes the form of a woven stainless steel mesh. The inner sheet 132 of the facing component part 13 is an open weave fabric formed from a carbon fibre/resin matrix composite material, the weave being such as to provide apertures constituted by the openings between adjacent warp and weft threads of the fabric. The fabric is preferably so woven as to produce a proportion of open aperture area relative to the total surface area of the sheet of say 30%. The fabric is also so woven that a relatively large number of its apertures are contained within the bounds of each cell 15 of the honeycomb core 12.

The outer facing sheet 131 is bonded to the inner facing sheet 132 and the inner facing sheet 132 is secured to the upper face of the honeycomb core 12 by means of an epoxy resin adhesive.

The backing sheet 11 is unperforated and made from a non-porous impermeable sheet material and is secured by an epoxy resin adhesive to a lower face of the honeycomb core 12.

The walls of the cells 15 of the core 12 are made from a non-porous impermeable sheet. The cells 15 are preferably provided with drainage slots 16 to allow for condensates to drain from the panel 10.

The panel 10 is typically of arcuate form, possibly of double curvature, and is embodied as a structural part of a duct of a nose cowl of the turbofan aero engine, the panel 10 being one of several arcuate panels P disposed just upstream of the fan of the engine.

Such noise attenuation panels when used in aeroengine nacelles are termed acoustic liners and absorb engine intake noise by allowing a controlled resonance to occur with partially closed honeycomb cells.

In a typical manufacturing procedure for such panels, the following steps are carried out:

(1) The backing sheet 11 is precured
(2) The open weave inner facing sheet 132 is precured to a predetermined profile
(3) The cured inner facing sheet 132 is bonded to the stainless steel mesh outer facing sheet 131
(4) Adhesive is reticulated onto the walls of the cells of the honeycomb core 12.
(5) The above components are assembled and bonded together, that is to say, the backing sheet 11, the honeycomb core 12 and the pre-bonded outer and inner sheets 131, 132.

Figure 3A:
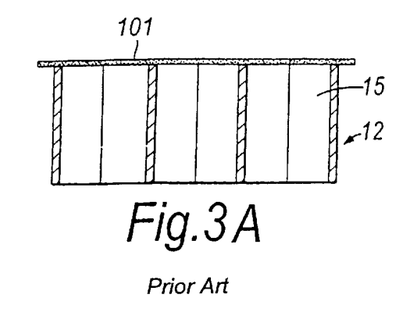
FIG. 3A to FIG. 3F (hereinbefore referred to) are schematic cross-sectional scrap views of cells of the cellular component part of the panel shown in FIG. 2 at successive stages in the forming of the reticulated adhesive beads on the ends of the walls of the cells of the cellular component part prior to bonding of the cellular component part to a facing component part of the panel.
Figure 3B:
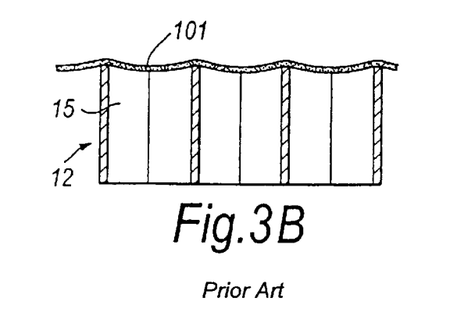
Figure 3C:
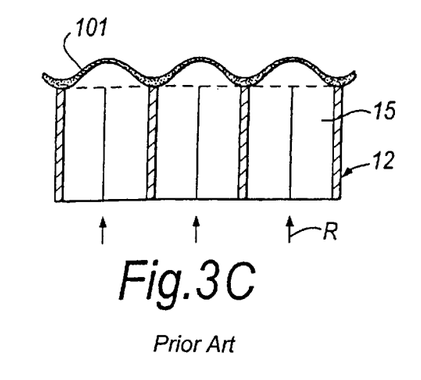
Figure 3D:
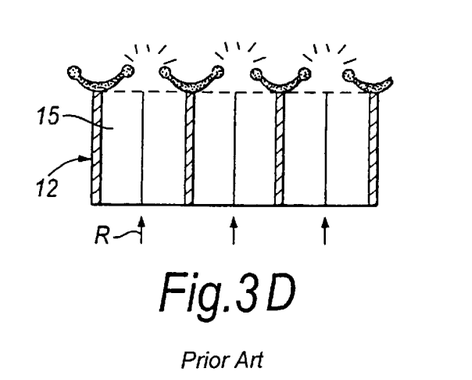
Figure 3E:
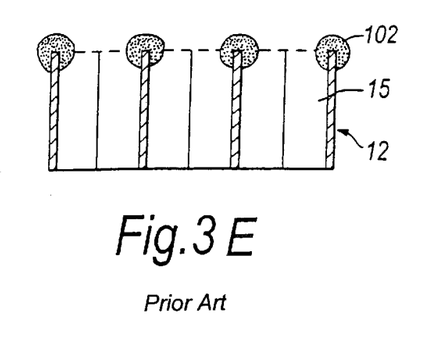
Figure 3F:
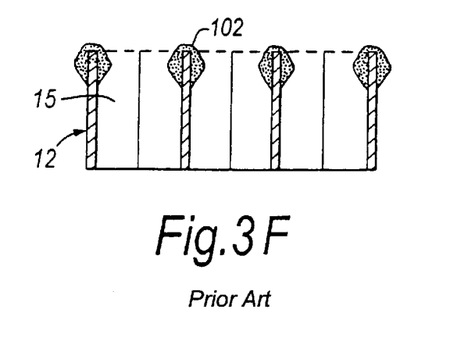

The application of adhesive to the honeycomb core 12 is typically carried out as illustrated in FIG. 3(A) to FIG. 3(F) and comprises the following steps:

A) Adhesive film 101 is applied to the face of honeycomb core 12, as illustrated in FIG. 3(A),
B) The adhesive film 101 is heated so that it tacks to side walls of the cells 15 of the honeycomb core, as illustrated in FIG. 3(B),
C) Hot air is applied to the adhesive film 101 in the direction of the arrows R to cause the adhesive film 101 to balloon while thinning the film at the mid point of each cell, as illustrated in FIG. 3(C),
D) The adhesive film 101 is caused to burst and starts to reticulate, as illustrated in FIG. 3(D),
E) The adhesive film fully reticulates to envelop the ends of the cell walls and form beads 102, as illustrated in FIG. 3(E), and
F) Special heat treatment is applied to improve containment of the reticulated adhesive, as illustrated in FIG. 3(F).

Figure 4:
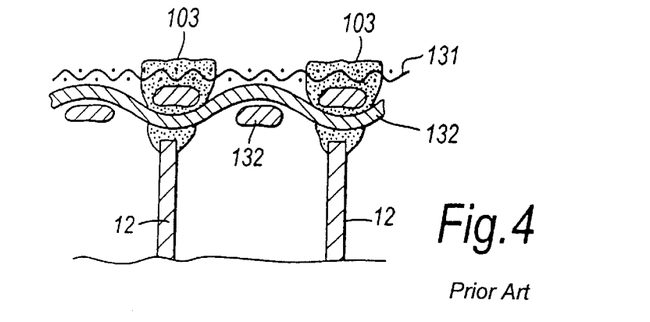
FIG. 4 (hereinbefore referred to) is a schematic scrap view cross-sectional scrap view of a cell of the cellular component part of the panel shown in FIG. 1 illustrating the adhesive bleed through the inner and outer facing sheets of the facing component part of the panel shown in FIG. 2 during bonding of the facing component part to the cellular component part.

During the final stage bonding of the pre-bonded sheets 131 and 132 to the honeycomb core 12 adhesive bleeds through the outer facing sheet 132 causing cosmetic spots 103 as illustrated in FIG. 4. Furthermore, the volume of adhesive deposited around the honeycomb cell edges is non-uniform.

In an attempt to control adhesive flow, an oven stabilisation cycle was introduced after reticulation and prior to final stage cure. It causes adhesive to flow away from the cell edge and also introduces a degree of cure advance. In theory a more uniform adhesive bead 102 is formed with a higher initial viscosity which is less prone to excessive flow during final stage cure.

It has however been found that oven stabilisation is not always successful and that a critical size adhesive droplet 103 will flow through a typical open area intersection as shown in FIG. 4.

The spotting effect is unpredictable and a function of reticulation, stabilisation and autoclave cure combined with adhesive chemistry/viscosity.

SUMMARY OF THE INVENTION

It is an object of the present invention to provide a noise attenuation panel so constructed as not to give rise to the above-mentioned adverse spotting effects at the front surface of the outer facing sheet of a noise attenuation panel.

According to a first aspect of the present invention there is provided a method of manufacturing a noise attenuation panel which comprises:

a cellular component part which has a front face, a rear face and wall portions which extend from the front face to the rear face and which provide bounding surfaces for a multiplicity of cells which extend from the front face to the rear face, and a facing component part which:

has a front face and a rear face, extends across the ends of the cells of the cellular component part at the front face therof with the rear face of the facing component part adjacent the front face of the cellular component part, is formed with a multiplicity of apertures which provide gaseous fluid communication between the cells of the cellular component part and the front face of the facing component part for the attenuation of noise generated by gaseous fluid flow over the surface of the front face of the facing component part, the method comprising:

bonding the facing component part to the cellular component part by the steps of:

applying an adhesive film to the front face of the cellular component part causing the film to reticulate to the ends of the walls of the cells at the front face of the cellular component part, introducing an adhesive flow control sheet between the front face of the cellular component part and the rear face of the facing component part, bringing the two component parts together, with the interposition of the adhesive flow control sheet, and causing the reticulated adhesive on the ends of the wall portions of the cells of the cellular component part to bond the two component parts together with adhesive flow to the facing component part under the control of the adhesive flow control sheet.

In an embodiment of the invention according to its first aspect, the rear face of the outer facing sheet and the front face of the inner facing sheet are bonded to form the facing component part prior to the step of bringing the facing and cellular component parts together for bonding together by the reticulated adhesive.

In an embodiment of the invention according to its first aspect the adhesive flow control sheet is a low areal/weight fibre dominated control sheet. The control sheet may be formed from or includes fibres which are randomly chopped and distributed, knitted or woven.

In an embodiment of the invention the control sheet is in the form of an open weave fabric such as a scrim and the fibres of the fabric are glass, polyester, aramid or carbon fibres.

In accordance with an embodiment of the invention hereinafter to be described, the facing component part comprises an outer facing sheet having a front face and a rear face and formed with a multiplicity of apertures which provide gaseous fluid communication between the front face and the rear face thereof, and an inner facing sheet having a front face and a rear face and formed with a multiplicity of apertures which provide gaseous fluid communication between the front face and the rear face. The rear face of the outer facing sheet is bonded to the front face of the inner facing sheet, and the reticulated adhesive during bonding of the two component parts flows under the control of the adhesive flow control sheet to bond the rear face of the inner facing sheet to the ends of the walls of the cellular component part. Reticulated adhesive flow is then so controlled by the adhesive flow control sheet as to penetrate and bond to the inner facing sheet without penetration to the outer facing sheet.

The outer facing sheet may take the form of a mesh forming a regular array of apertures opening on to the front face thereof. The mesh may be a woven stainless steel mesh. The inner facing sheet of the facing component part may be in the form of an open weave fabric such as a Hexcell open weave fabric.

According to a second aspect of the invention there is provided a noise attenuation panel produced by the method according to the first aspect of the invention.

BRIEF DESCRIPTION OF THE DRAWINGS

Embodiments of the invention will now be described by way of example with reference to the accompanying drawings in which.

DETAILED DESCRIPTION OF THE EMBODIMENTS

Figure 5:
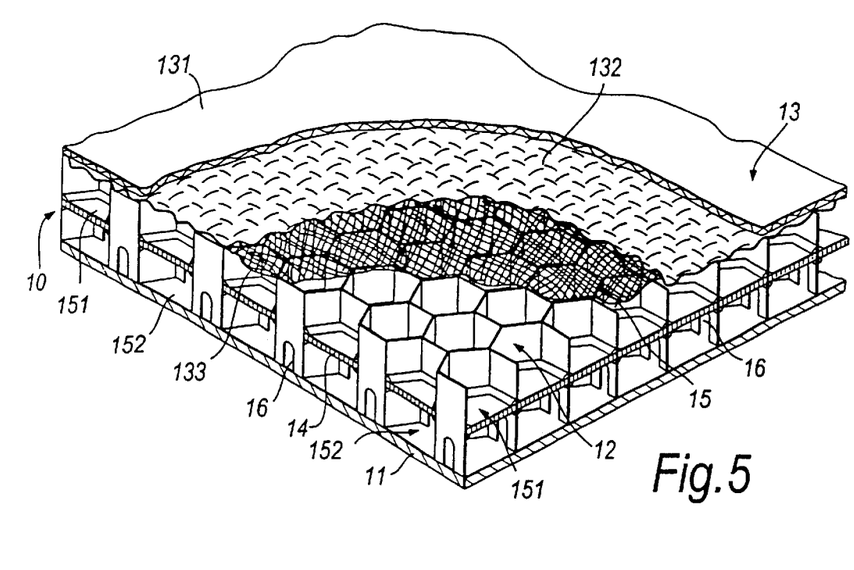
FIG. 5 is a schematic isometric view of the panel shown in FIG. 2, but modified in accordance with the invention to include an adhesive flow control sheet interposed between the cellular component part and the inner facing sheet of the facing component part of the panel.

Referring now to FIG. 5, it will be seen that the panel 10 illustrated in FIG. 2 is modified by the interposition of an adhesive flow control sheet 133 between the inner facing sheet 132 of the facing component part 13 and the honeycomb core 12.

The panel shown in FIG. 5 is produced by following the manufacturing procedure hereinbefore described except insofar that the components of the panel are assembled prior to bonding together with the interposition of the adhesive flow control sheet 133, that is to say, the backing sheet 11, the honeycomb core 12 bearing the reticulated adhesive beads 102 on the ends of the cell walls as illustrated in FIG. 3(v), the adhesive flow control sheet 133 and the pre-bonded outer and inner facing sheets 131 and 132.

Figure 6:
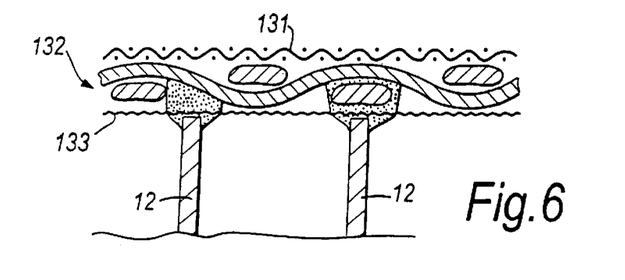
FIG. 6 is a schematic scrap view illustrating the containment of adhesive flow by the adhesive flow control sheet during manufacture of the panel shown in FIG. 5.

The interposition of the adhesive flow control sheet 133 serves to control adhesive flow so that it is contained within the bounds of the inner facing sheet 132 as schematically illustrated in FIG. 6 and does not extend through the sheet 132 to the outer facing sheet 131.

The outer facing sheet 131 is in the form of a woven stainless steel mesh while the inner sheet 132 takes the form of an open weave fabric.

Figure 7A:
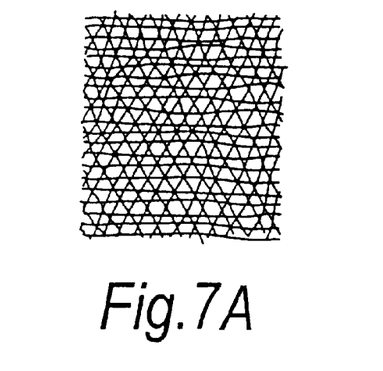
FIGS. 7(A) to FIG. 7(B) are scrap views illustrating the alternative forms of the adhesive flow control sheet of the panel shown in FIG. 5.
Figure 7B:
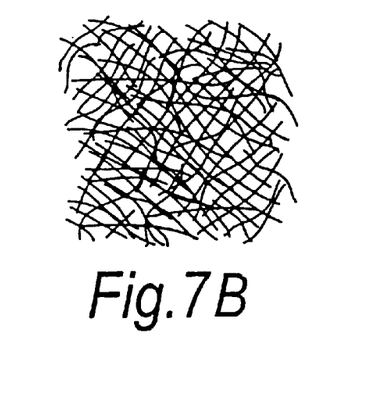
Figure 7C:
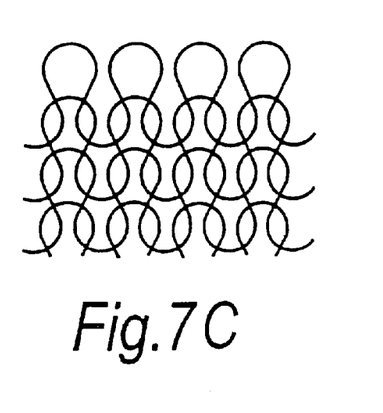

The adhesive flow control sheet 133 preferably takes the form of a lightweight scrim or mesh formed from polyester, carbon, glass or aramid fibres and FIG. 7(i) to FIG. 7(iii) illustrate three forms of the sheet 133, namely, an open weave fabric, a random fibre fabric and a knitted fabric.

Figures 8, 9:
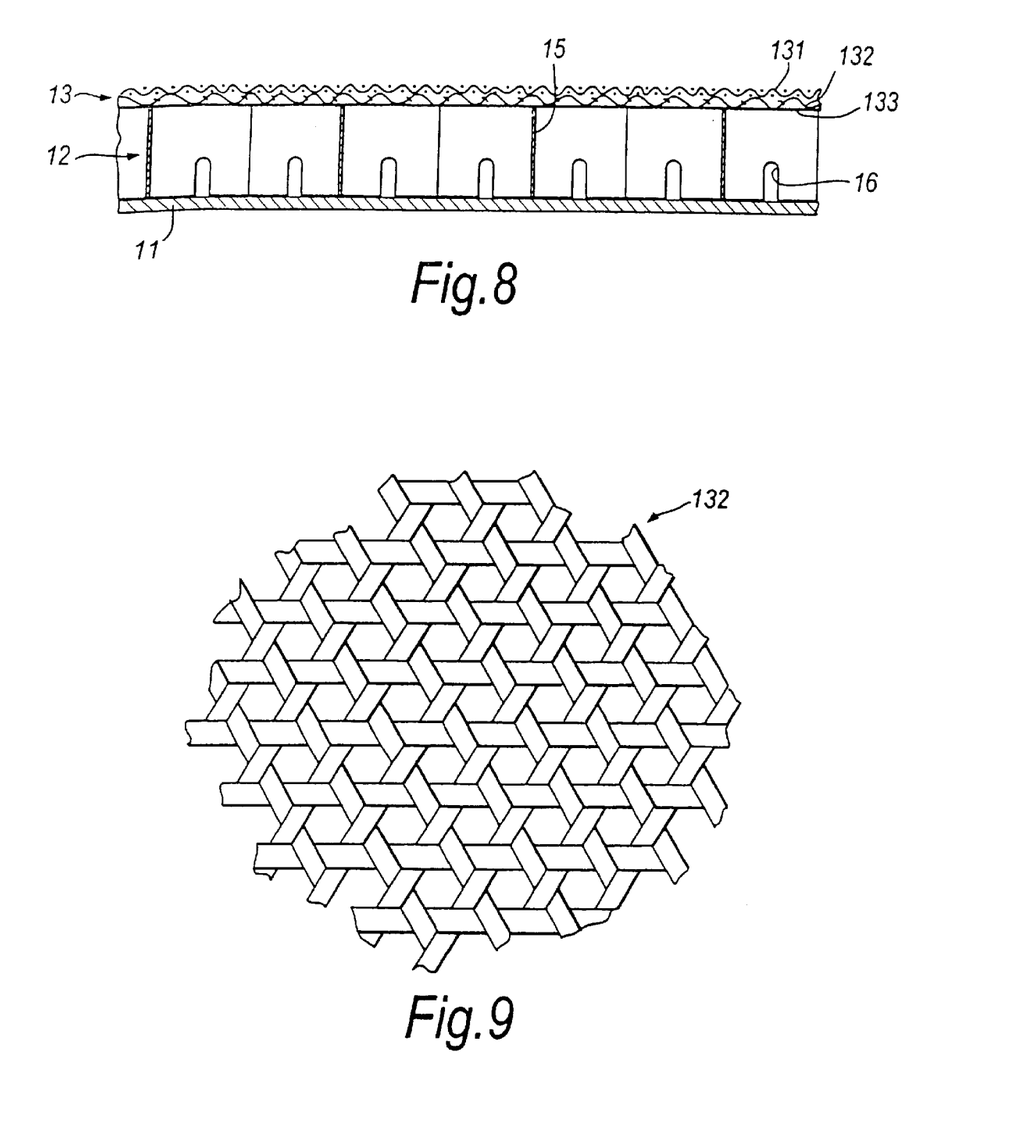
FIG. 8 is a schematic cross-section of a part of an alternative noise attenuation panel produced in accordance with the invention.
FIG. 9 is a schematic plan view of a triaxial open weave fabric forming the inner sheet of the facing component part of the panel shown in FIG. 8.

Referring now to FIG. 8, an alternative noise attenuation panel constructed in accordance with the invention is shown, in which the honeycomb core 12 is constructed from cells 15 which extend from the backing sheet 11 to the facing component part 13 without sub-division by the septums 14 of the panel shown in FIG. 5.

The facing component part 13 comprises the outer and inner facing sheets 131 and 132 with the interposition of an adhesive flow control sheet 133 between the inner facing sheet 132 and the ends of the walls of the cells 15 of the honeycomb core 12.

The outer facing sheet 131 is in the form of a stainless steel mesh and the inner sheet 132 takes the form of a triaxial open weave fabric as illustrated in FIG. 9.

The adhesive flow control sheet 133 may be manufactured from glass, polyester, aramid or carbon fibres to form a fabric in any of the forms illustrated in FIG. 7(i) to FIG. 7(iii) and the panel is manufactured in accordance with the invention in the manner described for the panel shown in FIG. 5 with the same containment of adhesive flow as illustrated in FIG. 6.

The backing sheet 11 is an impervious laminate and the honeycomb core 12 may be made from nomex, glass, aluminium or carbon.

Figure 10:
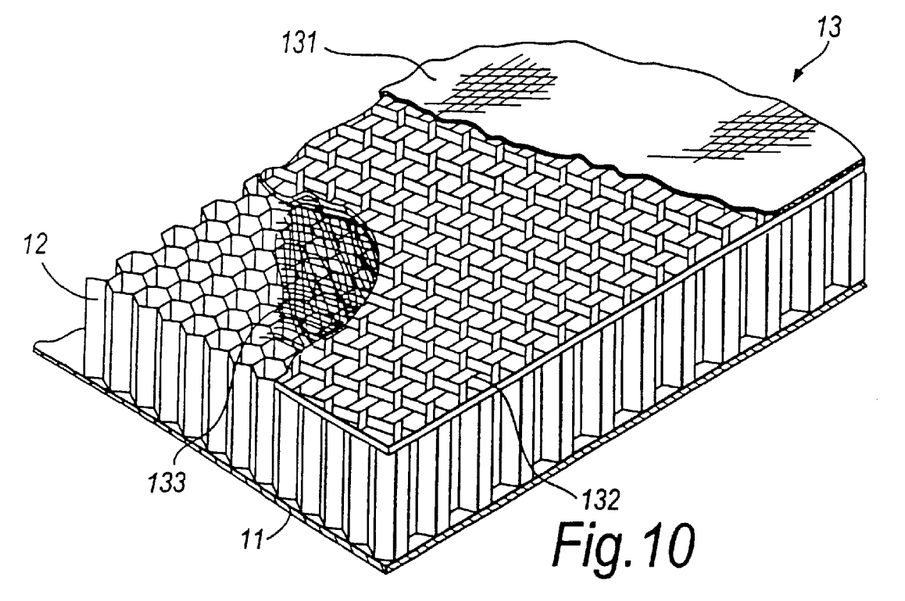
FIGS. 10 and 11 are schematic isometric views of other noise attenuation panels modified in accordance with the invention to include an adhesive control sheet interposed between the cellular component part and the inner facing sheet of the facing component part of the panel.
Figure 11:
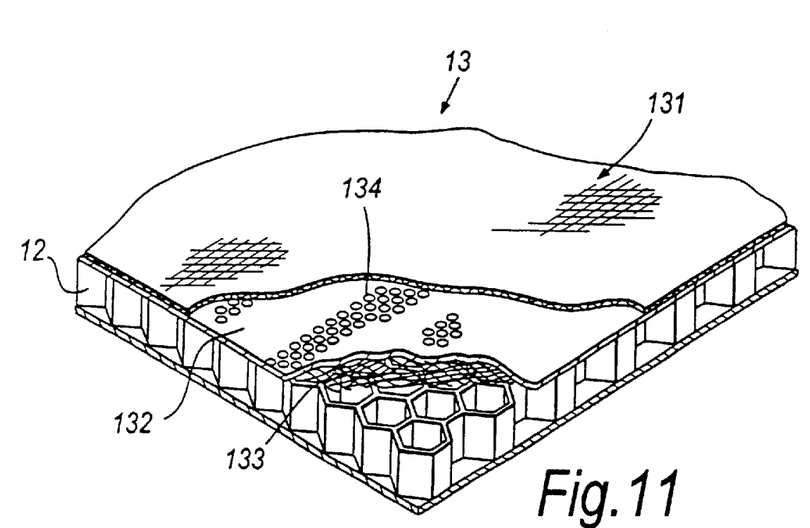

Referring now to FIGS. 10 and 11, two further alternative panel constructions are illustrated, each of which is produced by the method according to the invention and in each of which an adhesive flow control sheet 133 is interposed between the ends of the cells of the honeycomb core 12 and the inner facing sheet 132 of the facing component part 13.

In the panel shown in FIG. 10, the outer facing sheet 131 is again a stainless steel mesh and the inner facing sheet 132 is in the form of a triaxial open weave fabric. The backing sheet 11 may be of a composite or metallic construction.

The panel shown in FIG. 11 includes the adhesive flow control sheet 133 interposed between the ends of the cells of the honeycomb core 12 and the inner facing sheet 132 of the facing component part 13. The outer facing sheet 131 is a stainless steel mesh while the inner facing sheet is a perforate carbon/epoxy or metallic sheet having apertures 134.

The panels shown in FIGS. 10 and 11 are produced by the method in accordance with the invention and as described for production of the panel illustrated in FIG. 5 in which adhesive flow is confined to the inner facing sheet 132 as illustrated in FIG. 6.

The introduction of a low areal/weight fibre dominated central sheet 133 between adhesive reticulated honeycomb core 12 and precured facing component 13 (open weave sheet 132 and SS mesh 131) acts as a mechanism for controlling excess adhesive flow whilst achieving the desired honeycomb core to open weave bond.

The control sheet 133 may be manufactured from glass, polyester aramid or carbon. Fine filaments, densely packed and lightweight are considered best to prevent bleed through of the adhesive.

The bond strength between core 12 and facing component part 13 should remain unchanged or improved and the airflow properties of the panel outer and inner facing sheets 131, 132 should also remain unchanged or improved.

The mechanism for controlling excess adhesive flow is expected to be a function of the adhesive surface tension chemistry interactivity with the fibres of the adhesive flow control sheet.

Interposing the adhesive flow control sheet 133 between the open weave inner facing sheet 132 and the honeycomb core 12 for the final bonding step in the manufacture of a noise attenuation panel has the following benefits:

1) Total control of adhesive flow and guaranteed zero cosmetic spot defects.
2) Enhanced bond strength due to removal of oven stabilisation process and use of adhesive in a 'fresh' state i.e., at early stage of cure.
3) Introduction of an adhesive control sheet of glass, for example, also provides an isolation layer and allows any honeycomb core material to be employed as the set up of a corrosive galvanic cell is prevented.
4) The adhesive reticulation process can be simplified to a single pass at reduced temperature which complies better with the equipment's specification.
5) The adhesive flow control sheet principle may be applied to all forms of facing component parts such as:
   Drilled perforates (composite and metallic)
   Orthogonal open weave
   triaxial open weaves—metallic mesh combinations
   Fibre reinforced thermoplastic perforates
6) The panels produced according to the invention may be single and double layer acoustic liners.

What is claimed is:

1. A method of manufacturing a noise attenuation panel having:
   a cellular component part which has a front face, a rear face and wall portions which extend from the front face to the rear face and which provide bounding surfaces for a multiplicity of cells which extend from the front face to the rear face, and
   a facing component part which:
      has a front face and a rear face,
      extends across the ends of the cells of the cellular component part at the front face thereof with the rear face of the facing component part adjacent the front face of the cellular component part,
      is formed with a multiplicity of apertures which provide gaseous fluid communication between the cells of the cellular component part and the front face of the facing component part for the attenuation of noise generated by gaseous fluid flow over the surface of the front face of the facing component part,
   the method comprising:
      bonding the facing component part to the cellular component part by the steps of:

applying an adhesive film to the front face of the cellular component part causing the film to reticulate to the ends of the walls of the cells at the front face of the cellular component part, introducing an adhesive flow control sheet between the front face of the cellular component part and the rear face of the facing component part, bringing the two component parts together, with the interposition of the adhesive flow control sheet, and causing the reticulated adhesive on the ends of the wall portions of the cells of the cellular component part to bond the two component parts together with adhesive flow to the facing component part under the control of the adhesive flow control sheet.

2. A method according to claim 1, wherein the rear face of the outer facing sheet and the front face of the inner facing sheet are bonded to form the facing component part prior to the step of bringing the facing and cellular component parts together for bonding together by the reticulated adhesive.

3. A method according to claim 1, wherein the adhesive flow control sheet is a low areal/weight fibre dominated control sheet.

4. A method according to claim 3, wherein the control sheet is formed from or includes fibres which are randomly chopped and distributed, knitted or woven.

5. A method according to claim 4, wherein the control sheet is in the form of an open weave fabric.

6. A method according to claim 4, wherein the fibres are in the form of densely packed fine filaments.

7. A method according to claim 3, wherein the fibres are glass, polyester, aramid or carbon fibres.

8. A method according to claim 1, wherein:

the facing component part comprises:

an outer facing sheet having a front face and a rear face and formed with a multiplicity of apertures which provide gaseous fluid communication between the front face and the rear face thereof, and an inner facing sheet having a front face and a rear face and formed with a multiplicity of apertures which provide gaseous fluid communication between the front face and the rear face;

wherein the rear face of the outer facing sheet is bonded to the front face of the inner facing sheet, and wherein the reticulated adhesive during bonding of the two component parts flows under the control of the adhesive flow control sheet to bond the rear face of the inner facing sheet to the ends of the walls of the cellular component part.

9. A method according to claim 8, wherein the reticulated adhesive flow is so controlled by the adhesive flow control sheet as to penetrate and bond to the inner facing sheet without penetration to the outer facing sheet.

10. A method according to claim 8, wherein the outer facing sheet is a mesh forming a regular array of apertures opening on to the front face thereof.

11. A method according to claim 10, wherein the mesh is a woven stainless steel mesh.

12. A method according to claim 8, wherein the inner facing sheet is an open weave fabric.

13. A noise attentuation panel comprising a cellular component part including a front face, a rear face and wall portions defining a multiplicity of cells extending from the front face to the rear face, the wall portions providing bounding surfaces on the front face;

a facing component part including a front face, a rear face and a multiplicity of apertures providing gaseous fluid communication between the cells of the cellular component part and the front face of the facing component part for the attenuation of noise generated by gaseous fluid flow over the surface of the front face of the facing component part, the facing component part extending across the ends of cells of the cellular component part of the front face thereof with the rear face of the facing component part adjacent the front face of the cellular component part;

a bond between the cellular component part and the facing component part including adhesive and an adhesive flow control sheet, the bond being formed by applying the adhesive as a film to the front face of the cellular component part, causing the film to reticulate to the ends of the wall portions of the cells at the front face of the cellular component part, introducing the adhesive flow control sheet between the front face of the cellular component part and the rear face of the facing component part, bringing the two component parts together, with the interposition of the adhesive flow control sheet, and causing the reticulated adhesive on the ends of the wall portions of the cells of the cellular component part to bond the two component parts together with adhesive flow to the facing component part under the control of the adhesive flow control sheet. between the front face of the cellular component part and the rear face of the facing component part, bringing the two component parts together, with the interposition of the adhesive flow control sheet, and causing the reticulated adhesive on the ends of the wall portions of the cells of the cellular component part to bond the two component parts together with adhesive flow to the facing component part under the control of the adhesive flow control sheet.

* * * * *

UNITED STATES PATENT AND TRADEMARK OFFICE
CERTIFICATE OF CORRECTION

PATENT NO.    : 6,371,242 B1                                      Page 1 of 1
DATED         : April 16, 2002
INVENTOR(S)   : Wilson et al.

It is certified that error appears in the above-identified patent and that said Letters Patent is hereby corrected as shown below:

Column 7,
Line 18, delete "1" and insert therefor -- 8 --.

Column 8,
Lines 43-53, delete "between the front face of the cellular component part and the rear face of the facing component part, bringing the two component parts together, with the interposition of the adhesive flow control sheet, and causing the reticulated adhesive on the ends of the wall portions of the cells of the cellular component part to bond the two component parts together with adhesive flow to the facing component part under the control of the adhesive flow control sheet".

Signed and Sealed this

Twenty-fifth Day of March, 2003

JAMES E. ROGAN
*Director of the United States Patent and Trademark Office*